United States Patent
Umehara (10) Patent No.: US 6,781,526 B2
(45) Date of Patent: Aug. 24, 2004

(54) INFORMATION RECORDING APPARATUS AND INFORMATION RECORDING METHOD

(75) Inventor: Yasuyuki Umehara, Tokorozawa (JP)

(73) Assignee: Pioneer Corporation, Tokyo-To (DE)

(*) Notice: Subject to any disclaimer, the term of this patent is extended or adjusted under 35 U.S.C. 154(b) by 0 days.

(21) Appl. No.: 10/414,503

(22) Filed: Apr. 16, 2003

(65) Prior Publication Data

US 2004/0004561 A1 Jan. 8, 2004

(30) Foreign Application Priority Data

Apr. 18, 2002 (JP) .................................... P2002-115716

(51) Int. Cl.$^7$ .............................................. H03M 7/00
(52) U.S. Cl. .......................... 341/50; 341/51; 341/144
(58) Field of Search ........................... 341/144, 50, 51; 345/716; 369/30.09; 711/100

(56) References Cited

U.S. PATENT DOCUMENTS 5,897,652 A * 4/1999 Maeda ........................ 711/100
6,088,304 A * 7/2000 Aramaki et al. ............ 369/30.09
6,462,753 B1 * 10/2002 Koyata et al. ............... 345/716

* cited by examiner

Primary Examiner—Jean Bruner Jeanglaude
(74) Attorney, Agent, or Firm—Morgan, Lewis & Bockius LLP (57) ABSTRACT

An information recording apparatus including an information reproduction unit for reading data recorded in a recording/reproducing medium; a decoder for decoding the data recorded in the recording/reproducing medium based on a signal from the information reproduction unit; a digital video compression unit for encoding the signal decoded by the decoder; and an information recording unit for recording the data encoded by the digital video compression unit into a recording/reproducing medium. The decoder is controlled to continuously decode the data recorded in the recording/reproducing medium including a portion erased by edition, and the digital video compression unit is controlled to discontinue the encoding of the signal in accordance with the portion erased by the edition.

8 Claims, 7 Drawing Sheets

INFORMATION RECORDING APPARATUS AND INFORMATION RECORDING METHOD

BACKGROUND OF THE INVENTION

1. Field of the Invention

The present invention relates to an information recording apparatus and information recording method in which data recorded in a first recording medium is decoded and subsequently recorded in a second recording medium.

2. Description of the Related Art

Figure 7:
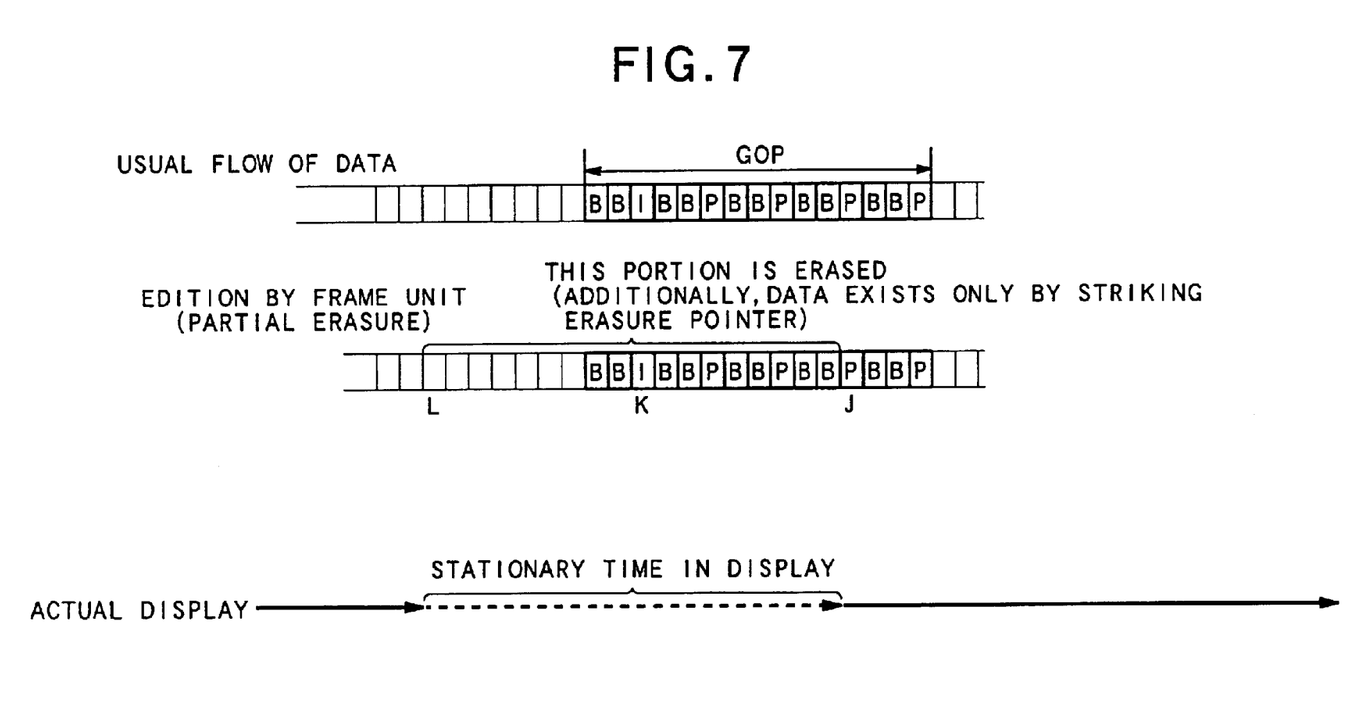
FIG. 7 is a diagram showing a related-art reproduction method of data.

For example, when a part (frame) of video is erased during edition of MPEG-encoded and recorded video, a method of striking an erasure point in a portion to be erased is used. When the edited video is reproduced, the erasure point is detected at a reproduction time, and thereby the edited portion can be recognized. As shown in FIG. 7, the erasure point can be struck by the unit of the frame, and the frame can be erased over a plurality of GOPs. In this case, image data of the frame which is an object of erasure is recorded as it is, and only the erasure point is attached to each frame. In FIG. 7, a portion between points "L" and "J" is an erased portion.

However, the MPEG-encoded image data is constituted of three types of frames referred to as I picture, P picture, and B picture. For the P and B pictures, it is impossible to decode the picture alone. That is, only when the I picture in the same GOP is used, the P picture can be decoded. When both the I and P pictures in the same GOP are used, the B picture can be decoded. Therefore, when portions before and after the portion to be erased in FIG. 7 are reproduced, even the erased portion needs to be continuously decoded. For this, the image data of the frame which is the object of erasure is left as such. Moreover, while the erased portion is decoded, a stationary image of the image (point of L) immediately before erased is displayed, Thereby, edited content is reflected.

However, an edition intention to erase a part of the video lies in that the portions before and after the erased portion are edited to be continuous. The displaying of the stationary image as described above does not match with the original edition intention.

SUMMARY OF THE INVENTION

An object of the present invention is to provide an information recording apparatus and information recording method in which data can be recorded in a continuous reproducible state of portions before and after an erased portion, when a part of video is erased by edition.

In one aspect of the present invention, an information recording apparatus for recording data recorded in a first recording medium (1) into a second recording medium (11, 11A), is provided with: a reading device (2) for reading the data recorded in the first recording medium (1); a decoder (4) for decoding the data recorded in the first recording medium (1) based on a signal from the reading device (2); a recording device (7, 9, etc.) for recording the data recorded in the first recording medium (1) into the second recording medium (11, 11A) based on the signal decoded by the decoder (4); and a control device (12, 12A) for controlling the decoder (4) and recording device (7, 9, etc.) so that the decoder (4) continuously decodes the data recorded in the first recording medium (1) including a portion erased by edition and the recording device (7, 9, etc.) discontinues the recording in accordance with the portion erased by the edition, wherein data before/after the portion erased by the edition is recorded in the second recording medium (11, 11A) so that the data can continuously be reproduced.

According to the information recording apparatus, the recording by the recording device is discontinued in accordance with the portion erased by the edition. Therefore, the data before/after the portion erased by the edition can be recorded in the second recording medium so that the data can continuously be reproduced.

The information recording apparatus of the present invention may further include a digital/analog converter (5) for converting the data outputted from the decoder (4) into an analog signal, wherein the recording device (9) receives the analog signal outputted from the digital/analog converter (5) to record the data recorded in the first recording medium (1) as the analog signal into the second recording medium (11A).

In this case, the data before/after the portion erased by the edition can be recorded as the analog signal in the second recording medium so that the data can continuously be reproduced.

In another aspect of the present invention, an information recording apparatus for recording data recorded in a first recording medium (1) into a second recording medium (11), is provided with: a reading device (2) for reading the data recorded in the first recording medium (1); a decoder (4) for decoding the data recorded in the first recording medium (1) based on a signal from the reading device (2); an encoder (7) for encoding the signal decoded by the decoder (4); a recording device (9) for recording the data encoded by the encoder into the second recording medium (11); and a control device (12) for controlling the decoder (4) and encoder (7) so that the decoder (4) continuously decodes the data recorded in the first recording medium (1) including a portion erased by edition and the encoder (7) discontinues the encoding of the signal in accordance with the portion erased by the edition.

According to the information recording apparatus, the encoding by the encoder is discontinued in accordance with the portion erased by the edition. Therefore, the data before/after the portion erased by the edition can be recorded in the second recording medium so that the data can continuously be reproduced.

The data recorded in the first recording medium (1) may include a data string arranged along a time series, and decoding of information (P picture, B picture) included in the data string during decoding by the decoder may require decoding of another information (I picture) included in the data string.

In this case, since the data including the portion erased by the edition is continuously decoded by the decoder, it is possible to decode the data before/after the portion erased by the edition. Therefore, all the portions left by the edition can be recorded.

In one aspect of the present invention, an information recording method for recording data recorded in a first recording medium (1) into a second recording medium (11, 11A), is provided with: a reading process of reading the data recorded in the first recording medium (1); a decoding process of decoding the data recorded in the first recording medium (1) based on a signal obtained by the reading process; and a recording process of recording the data recorded in the first recording medium (1) into the second recording medium (11, 11A) based on the signal decoded by the decoding process, wherein the decoding process continuously decodes the data recorded in the first recording medium (1) including a portion erased by edition, the recording process discontinues recording in accordance with the portion erased by edition, and data before/after the portion erased by the edition is recorded in the second recording medium (11, 11A) so that the data can continuously be reproduced.

According to the information recording method, the recording of the data is discontinued in accordance with the portion erased by the edition. Therefore, the data before/after the portion erased by the edition can be recorded so that the data can continuously be reproduced.

The information recording method may further include a converting process of converting the data obtained by the decoding process into an analog signal, wherein the recording process records the analog signal obtained by the converting process into the second recording medium (11A).

In this case, the data before/after the portion erased by the edition can be recorded as the analog signal in the second recording medium so that the data can continuously be reproduced.

In another aspect of the present invention, an information recording method for recording data recorded in a first recording medium (1) into a second recording medium (11), is provided with: a reading process of reading the data recorded in the first recording medium (1); a decoding process of decoding the data recorded in the first recording medium (1) based on a signal obtained by the reading process; an encoding process of encoding the signal decoded by the decoding process; and a recording process of recording the data encoded by the encoding process into the second recording medium (11), wherein the decoding process continuously decodes the data recorded in the first recording medium (1) including a portion erased by edition, and the encoding process discontinues encoding of the signal in accordance with the portion erased by the edition.

According to the information recording method, the encoding is discontinued in accordance with the portion erased by the edition. Therefore, the data before/after the portion erased by the edition can be recorded in the second recording medium so that the data can continuously be reproduced.

The information recording method, wherein the data recorded in the first recording medium (1) may include a data string arranged along a time series, and the decoding of information (P picture, B picture) included in the data string during the decoding by the decoding process may require decoding of another information (I picture) included in the data string.

In this case, since the data including the portion erased by the edition is continuously decoded, it is possible to decode the data before/after the portion erased by the edition. Therefore, all the portions left by the edition can be recorded.

It is to be noted that to facilitate the understanding of the present invention, reference numerals of the accompanying drawings are attached in parentheses, but the present invention is not limited to shown modes.

DESCRIPTION OF THE PREFERRED EMBODIMENTS

First Embodiment

A first embodiment of an information recording apparatus according to the present invention will be described hereinafter with reference to FIGS. 1 to 4.

Figure 1:
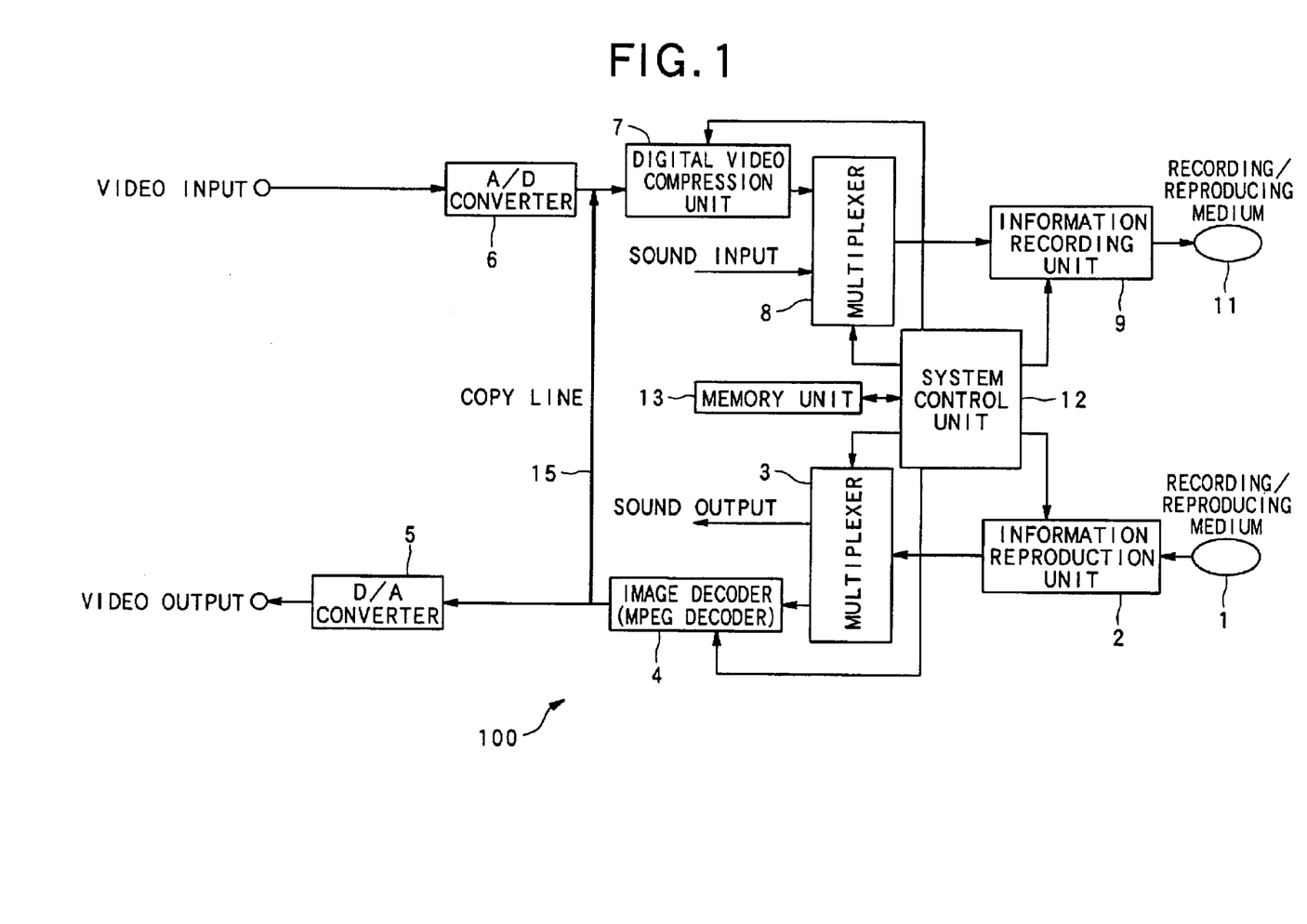
FIG. 1 is a block diagram showing an information recording apparatus according to a first embodiment.
Figure 2:
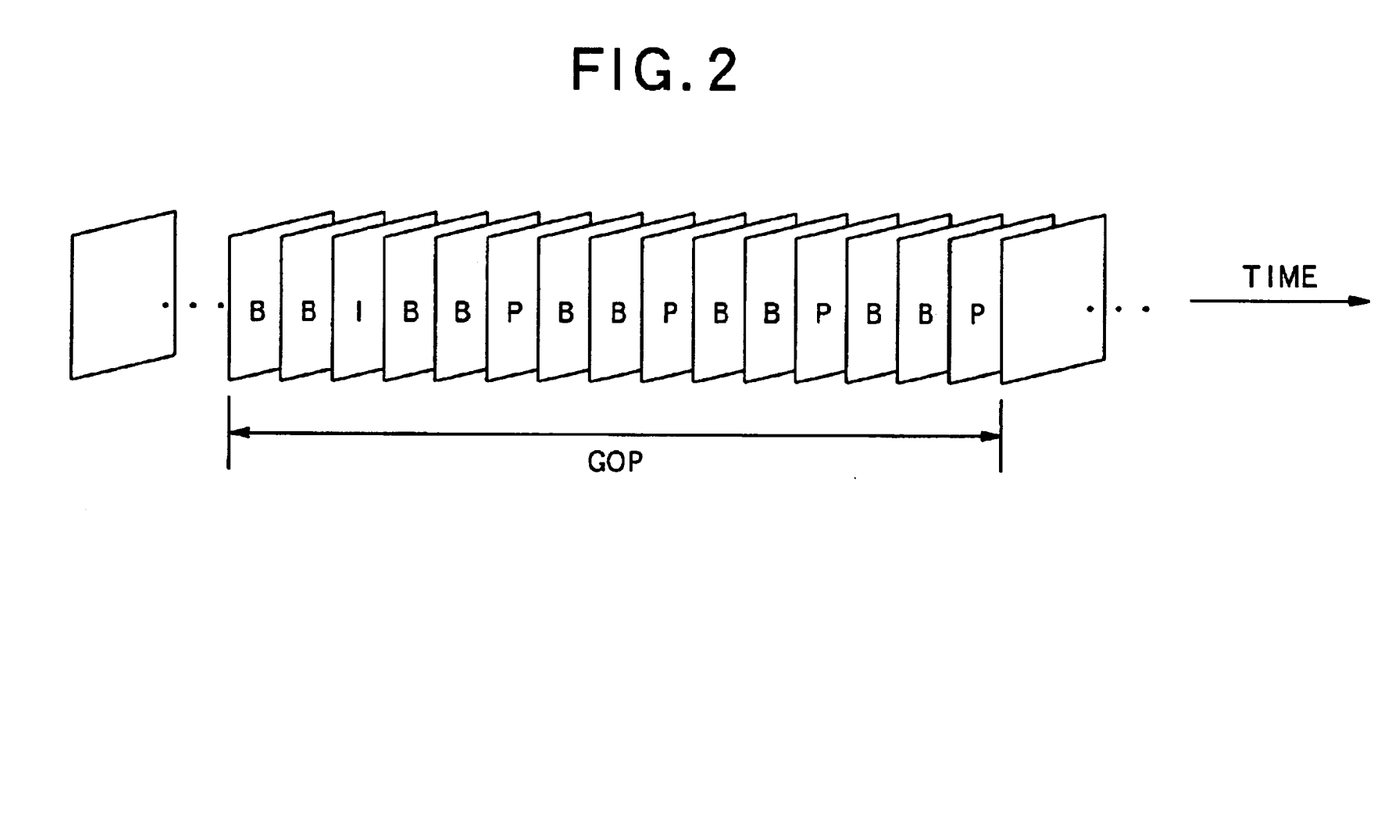
FIG. 2 is a diagram showing an operation of the information recording apparatus of the first embodiment.

FIG. 1 is a block diagram showing the information recording apparatus according to the first embodiment, and FIG. 2 is a diagram showing an operation of the information recording apparatus of the first embodiment.

As shown in FIG. 1, an information recording apparatus 100 includes: an information reproduction unit 2 which reads information recorded in a recording/reproducing medium 1 such as an optical disc or magnetic recording medium; a demultiplexer 3 which receives an, output signal from the information reproduction unit 2; an image decoder 4 which receives the output signal from the demultiplexer 3 to execute MPEG decode processing; a D/A converter 5 which converts a digital video signal outputted from the image decoder 4 to an analog video signal; an A/D converter 6 which converts the analog video signal to the digital video signal; a digital video compression unit 7 which compresses the digital video signal; a multiplexer 8 which receives the signal outputted from the digital video compression unit 7; an information recording unit 9 which records the signal outputted from the multiplexer 8 in a recording/reproducing medium 11 such as an optical disc or magnetic recording medium; a system control unit 12 which controls each component of the information recording apparatus 100; and a memory unit 13 in which information such as program necessary for control processing of the system control unit 12 is stored.

As shown in FIG. 1, the system control unit 12 controls operations of the information reproduction unit 2, demultiplexer 3, image decoder 4, video compression unit 7, multiplexer 8, information recording unit 9, and memory unit 13.

Next, an operation for recording the information recorded in the recording/reproducing medium 1 into the recording/reproducing medium 11 will be described with reference to FIGS. 2 to 4. An MPEG-encoded video signal is recorded in the recording/reproducing medium 1.

FIG. 2 is a diagram showing a principle at a duplicating time of the MPEG-encoded video signal. As shown in FIG. 2, when the video signal is MPEG-encoded, the original frame image is encoded into three types of pictures, and a plurality of pictures form one group to constitute GOP. Three types of pictures include I, P, and B pictures. The I picture is in-frame encoded video, and the decoding is possible only with this picture. The P picture can be decoded, only when the I picture in the same GOP is used. The decoding is impossible based on only the P picture. Furthermore, the B picture can be decoded, only when both the I and P pictures in the same GOP are used. In this manner, the P and B pictures cannot be decoded only with the corresponding frames. Therefore, when the MPEG-encoded video signal is duplicated, the respective pictures need to be decoded in a chain manner in order from the I picture.

Figure 3:
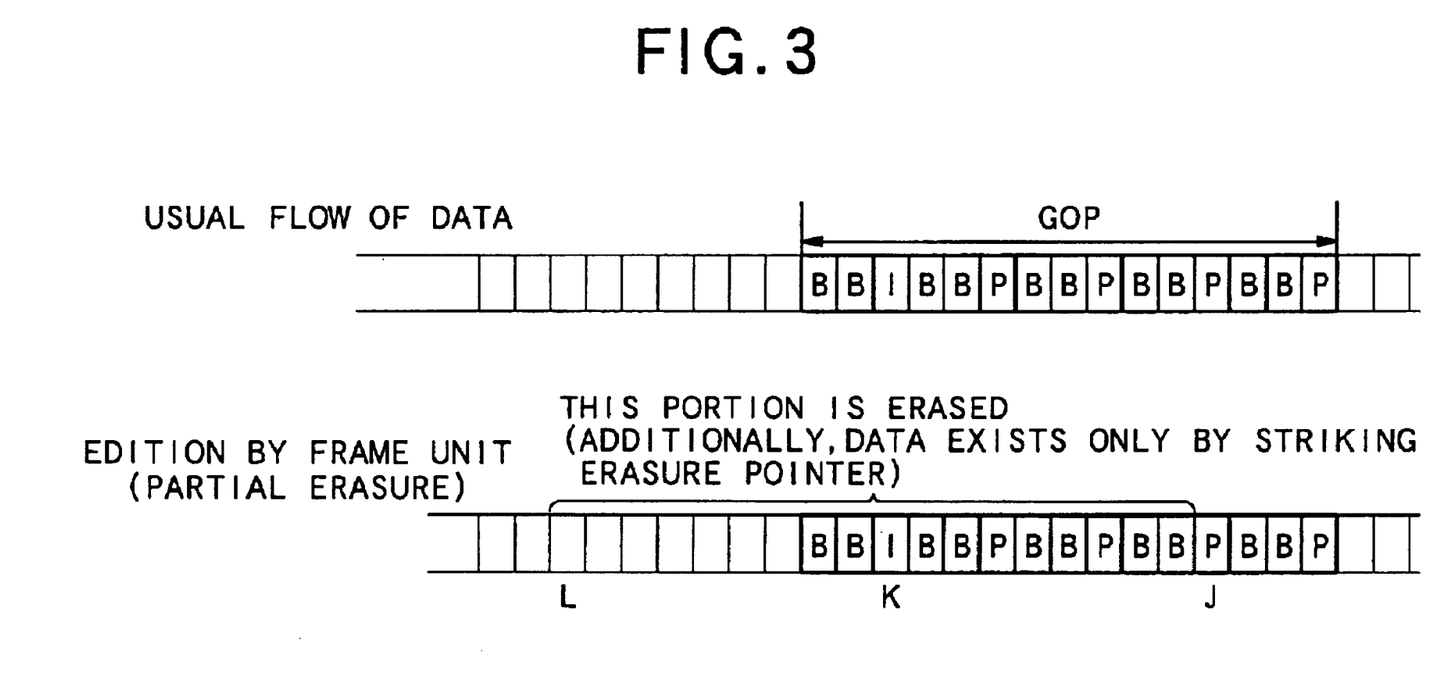
FIG. 3 is a diagram showing image data recorded in a recording/reproducing medium.

FIG. 3 is a diagram showing image data recorded in the recording/reproducing medium 1. As shown in FIG. 3, the image data obtained by compressing the video signal by MPEG encoding is recorded in the recording/reproducing medium 1, and a part of the image data is erased by edition. In FIG. 3, in the image data, the striking of an erasure point is shown between time points shown by "L" and "J". The edition can be performed by a frame unit, and an erased portion exists over two GOPs. Additionally, only the erasure point is attached to the portion erased by the edition, and a state recorded in the recording/reproducing medium 11 is maintained in the original image data.

When the information recorded in the recording/reproducing medium 1 is recorded in the recording/reproducing medium 11, the image data compressed and recorded in the recording/reproducing medium 1 is read by the information reproduction unit 2, and separated into image data MPEG-encoded by the demultiplexer 3 and MPEG-encoded sound data. The separated image data is MPEG-decoded by the image decoder 4 to form digital video data (base band). The digital video data is inputted into the digital video compression unit 7 via a copy line 15, and compressed to form digital video in the unit. Thereafter, the video data is synthesized with the compressed sound data by the multiplexer 8. The synthesized data is written in the recording/reproducing medium 11 by the information recording unit 9.

Next, the operation timing of the information recording apparatus according to the first embodiment will be described with reference to FIG. 4. In the first embodiment, while the image data is outputted from the information reproduction unit 2, the demultiplexer 3 and image decoder 4 continue to operate. Also with respect, to erased portions (portions L to J), the image data is continuously decoded based the image data recorded in the recording/reproducing medium.

Figure 4:
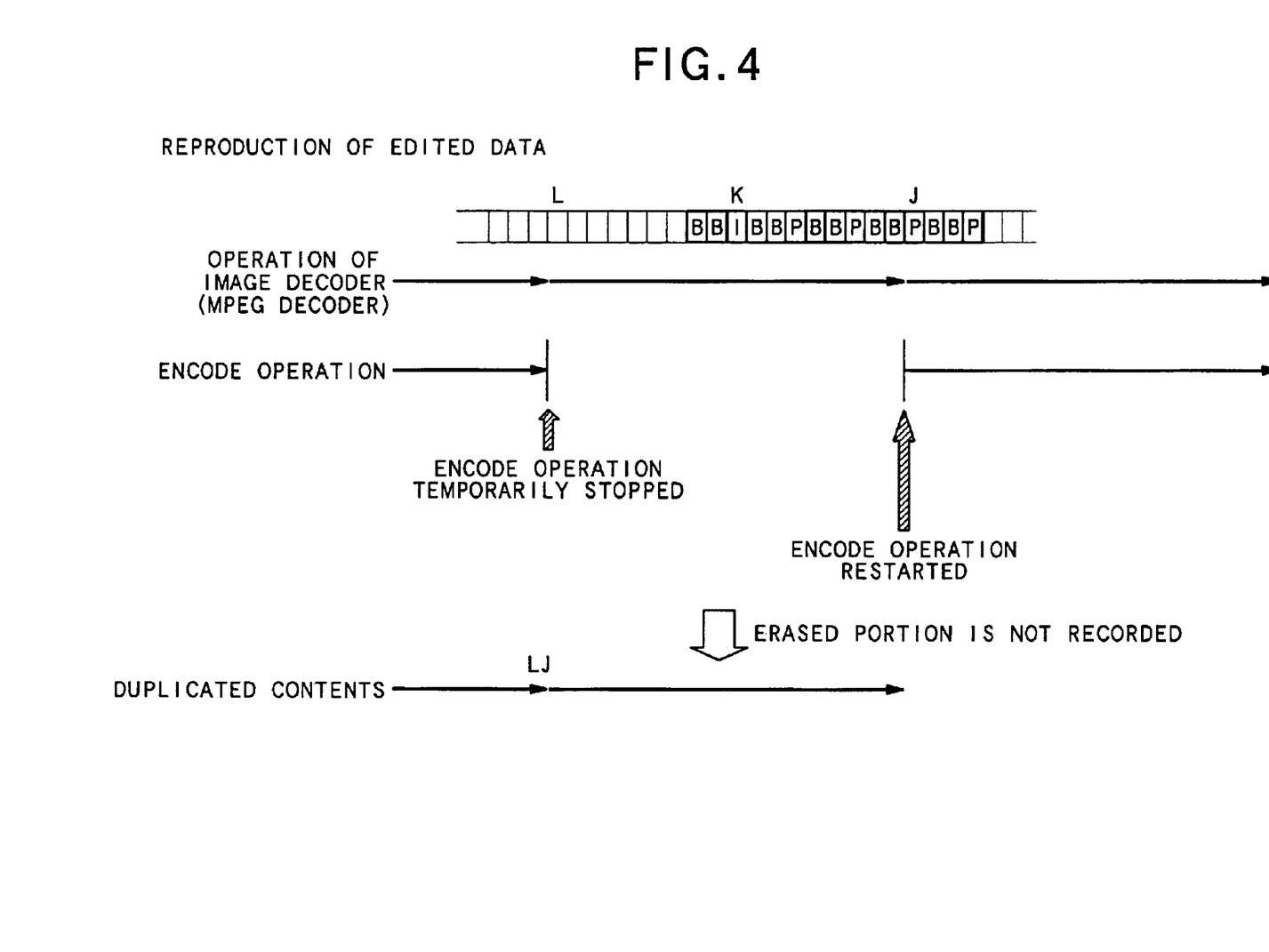
FIG. 4 is a diagram showing an operation timing of the information recording apparatus of the first embodiment.

On the other hand, as shown in FIG. 4, the operation of the video compression unit 7 is stopped in the portions (portions L to J) in which the image data is erased by the edition. That is, the system control unit 12 monitors a decode operation of the image decoder 4. On detecting that the point "L" is reached, the control unit instructs the digital video compression unit 7 to stop the encode operation. Thereafter, on detecting that the point "J" is reached based on the decode operation of the image decoder 4, the control unit instructs the video compression unit 7 to restart the encode operation. Thereby, the operation of the video compression unit 7 stops with respect to the portions from which the image data is erased.

The operation of the digital video compression unit 7 is temporarily stopped in this manner. Therefore, the portions from which the image data is erased by the edition are not recorded in the recording/reproducing medium 11. The data in which the point "L" is continued to the point "J" without any gap is recorded in the recording/reproducing medium 11. Therefore, when the data recorded in the recording/reproducing medium 11 is reproduced, the image of the point "L" is continuously switched to the image of the point "J", and it is not necessary to display any stationary image.

It is to be noted that the MPEG-decoded image data is continuously outputted as described above even with respect to the portion erased by the edition without stopping the operation of the image decoder 4. For example, in the portion erased by the edition, the I picture exists in a point shown by "k" in FIG. 4. This I picture is used to successively decode the P picture in the chain manner. Moreover, the I and P pictures are used to successively decode the B picture in the chain manner. Thereby, the data of the erased portion is decoded. Therefore, from a time when the point "J" is reached, the operation of the digital video compression unit 7 is restarted. Then, even when the point "J" is in any position in the GOP of the original image data, the image data can very frequently be encoded, and can be recorded into the recording/reproducing medium 11 from the point "J". Therefore, the edition by the frame unit can be reflected in the data recorded in the recording/reproducing medium 11 as such, and a timing of change of the recorded data is not bound by the unit of GOP of the original image data.

In the first embodiment, the digital video compression unit 7 is not limited to the MPEG encoder and, for example, a compression method using correlation compression between frames can also be applied.

Second Embodiment

A second embodiment of the information recording apparatus according to the present invention will be described hereinafter with reference to FIGS. 5 and 6. It is to be noted that in FIG. 5 the same components as those of the first embodiment are denoted with the same reference numerals and the description thereof is omitted.

Figure 5:
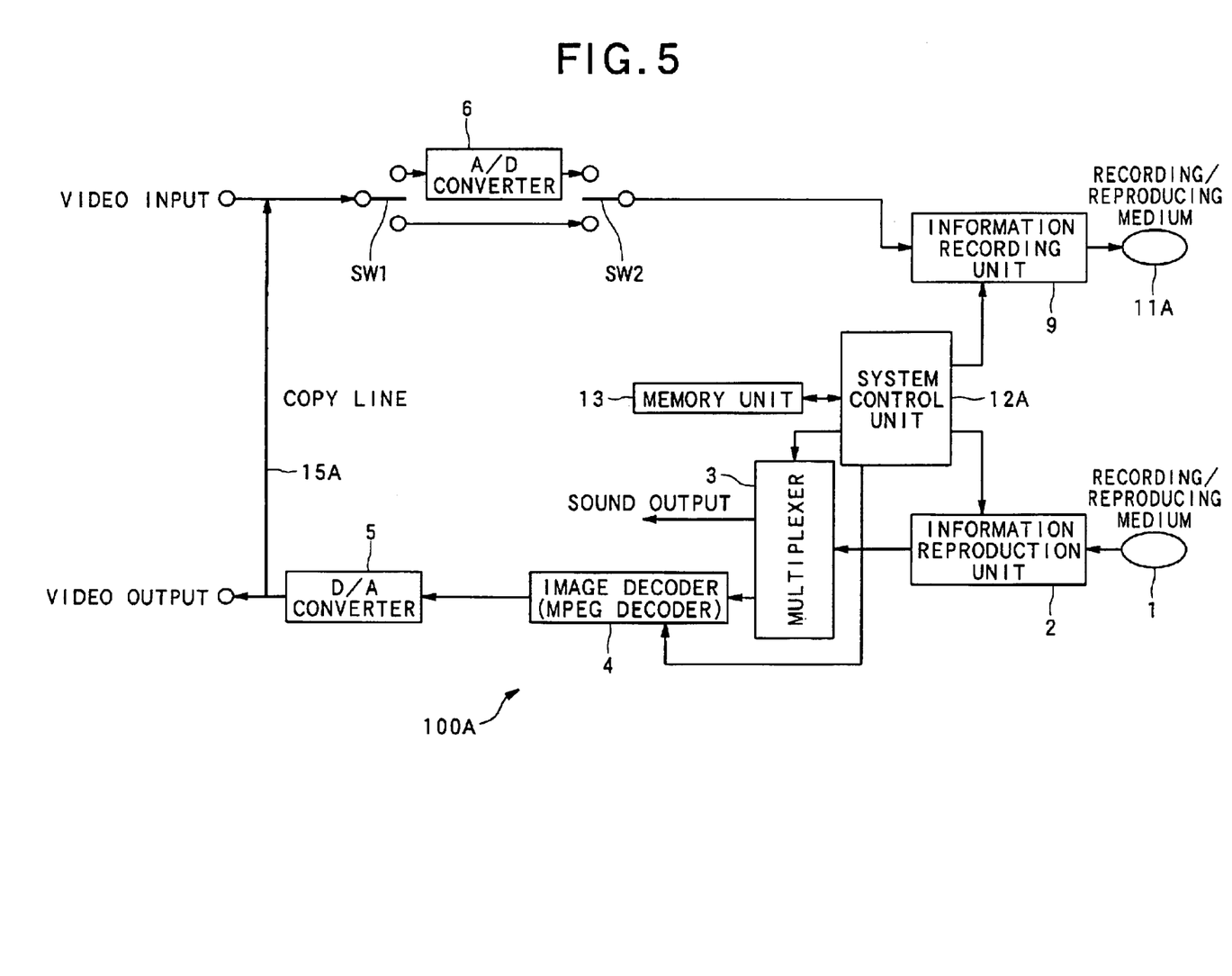
FIG. 5 is a block diagram showing the information recording apparatus of a second embodiment.

As shown in FIG. 5, an information recording apparatus 100A includes: the information reproduction unit 2 which reads the information recorded in the recording/reproducing medium 1 such as an optical disc or magnetic recording medium; the demultiplexer 3 which receives the output signal from the information reproduction unit 2; the image decoder 4 which receives the output signal from the demultiplexer 3 to execute the MPEG decode processing; the D/A converter 5 which converts the digital video signal outputted from the image decoder 4 to the analog video signal; the A/D converter 6 which converts the analog video signal to the digital video signal; the information recording unit 9 which records the digital/analog video signal in a recording/reproducing medium 11A such as an optical disc or magnetic recording medium; a system control unit 12A which controls each component of the information recording apparatus 100A; and the memory unit 13 in which the information such as the program necessary for the control processing of the system control unit 12A is stored. When the digital video signal is recorded in the recording/reproducing medium 11A, switches SW1 and SW2 disposed before/after the A/D converter 6 are set on input/output sides of the A/D converter 6. Moreover, when the analog video signal is recorded in the recording/reproducing medium 11A, the switches SW1 and SW2 disposed before/after the A/D converter 6 are set on the sides on which the video signal is passed without going through the A/D converter 6.

Next, the operation for recording the information recorded in the recording/reproducing medium 1 into the recording/reproducing medium 11A will be described with reference to FIG. 6.

When the information recorded in the recording/reproducing medium 1 is recorded as the analog video signal in the recording/reproducing medium 11A, the switches SW1 and SW2 are set on a side on which the A/D converter 6 is disconnected. The image data compressed and recorded in the recording/reproducing medium 1 is read by the information reproduction unit 2, and separated into the image data MPEG-encoded by the demultiplexer 3 and the MPEG-encoded sound data. The separated image data is MPEG-decoded by the image decoder 4 to form the digital video data (base band). The digital video data is converted to the analog video signal by the D/A converter 5.

The analog video signal is inputted into the information recording unit 9 via a copy line 15A and the switches SW1 and SW2. Therefore, analog video data is written in the recording/reproducing medium 11A.

Next, the operation timing of the information recording apparatus according to the second embodiment will be described with reference to FIG. 6. In the second embodiment, while the image data is outputted from the information reproduction unit 2, the demultiplexer 3 and image decoder 4 continue to operate. Also with respect to the erased portions (portions L to J), the image data is continuously decoded based the image data recorded in the recording/reproducing medium.

Figure 6:
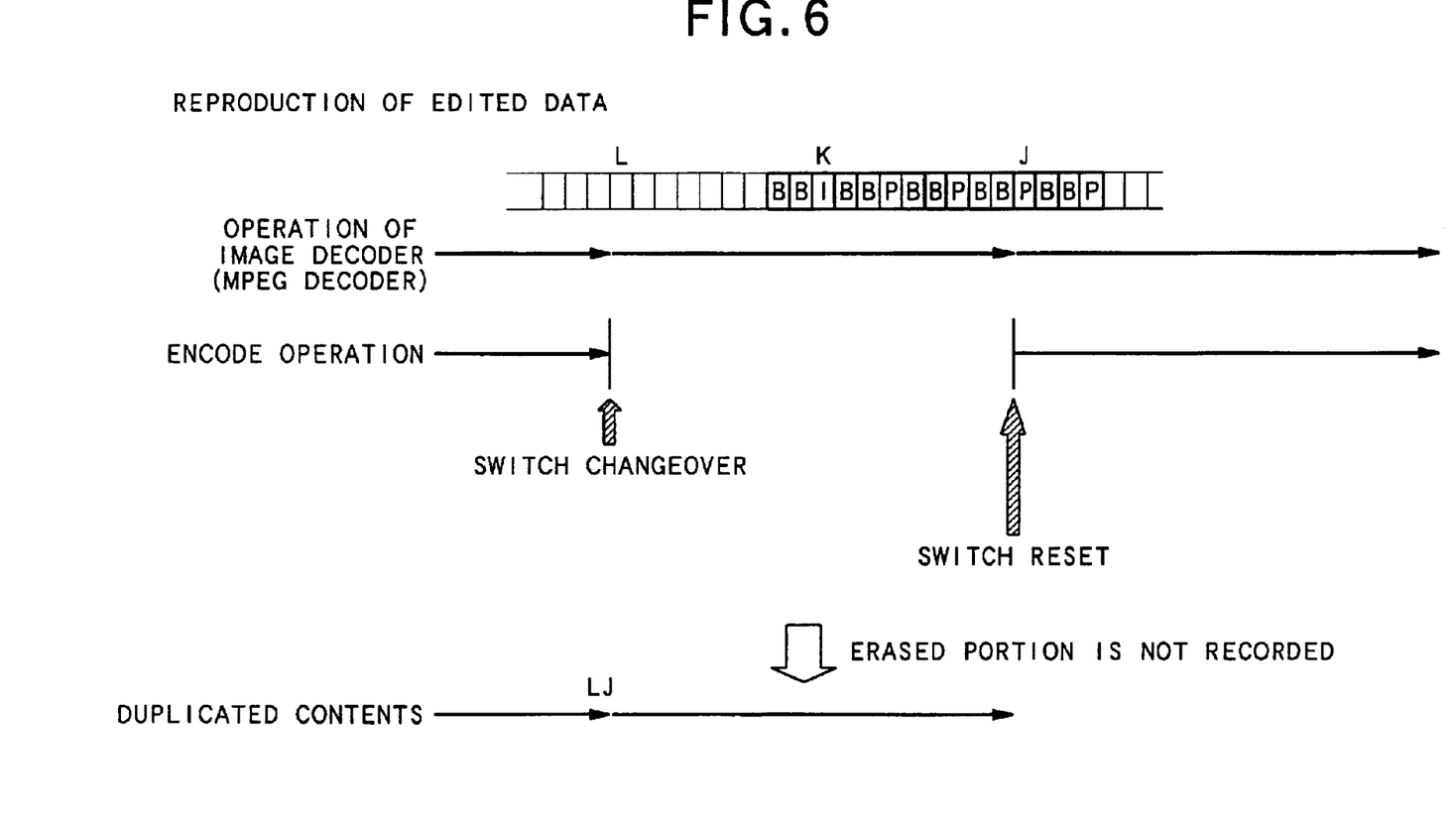
FIG. 6 is a diagram showing the operation timing of the information recording apparatus of the second embodiment.

On the other hand, as shown in FIG. 6, the inputting of the video signal into the information recording unit 9 is stopped in the portions (portions L to J) from which the image data is erased by the edition. That is, the system control unit 12A monitors the decode operation of the image decoder 4. On detecting that the point "L" is reached, the control unit switches the switch SW1 or SW2, and stops the inputting of the video signal into the information recording unit 9. Thereafter, on detecting that the point "J" is reached based on the decode operation of the image decoder 4, the control unit returns the switch SW1 or SW2 into original positions, and restarts the inputting of the video signal into the information recording unit 9.

The operation with respect to the information recording unit 9 is temporarily stopped in this manner. Therefore, the portions from which the image data is erased by the edition are not recorded in the recording/reproducing medium 11A. The signal in which the point "L" is continued to the point "J" without any gap is recorded in the recording/reproducing medium 11A. Therefore, when the data recorded in the recording/reproducing medium 11A is reproduced, the image of the point "L" is continuously switched to the image of the point "J", and it is not necessary to display any stationary image.

In the second embodiment, instead of switching the switch SW2 in accordance with the erased portion of the image data, the operation of the information recording unit 9 may also be stopped. Control may be executed so that the recording into the recording/reproducing medium 11A is discontinued in the erased portion of the image data, and this method is not limited to the above-described embodiments.

In the second embodiment, the digital video data outputted from the image decoder 4 may directly be inputted into the information recording unit 9. In this case, the operation of the information recording unit 9 is stopped in accordance with the erased portion of the image data. In a state in which the data before/after the erased portion is continued without any gap, the digital video data can be recorded in the recording/reproducing medium 11A.

In the above-described embodiments, the recording of the image data has been described, but the similar method can also be applied to the recording of the sound data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-115716 filed on Apr. 18, 2002 including the specification, claims, drawings and summary is incorporated herein by reference in its entirety.

What is claimed is:

1. An information recording apparatus for recording data recorded in a first recording medium into a second recording medium, comprising:

a reading device which reads the data recorded in the first recording medium;

a decoder which decodes the data recorded in the first recording medium based on a signal from the reading device;

a recording device which records the data recorded in the first recording medium into the second recording medium based on the signal decoded by the decoder; and a control device which controls the decoder and recording device so that the decoder continuously decodes the data recorded in the first recording medium including a portion erased by edition and the recording device discontinues the recording in accordance with the portion erased by the edition, wherein data before/after the portion erased by the edition is recorded in the second recording medium so that the data can continuously be reproduced.

2. The information recording apparatus according to claim 1, further comprising:

a digital/analog converter for converting the data outputted from the decoder into an analog signal, wherein the recording device receives the analog signal outputted from the digital/analog converter to record the data recorded in the first recording medium as the analog signal into the second recording medium.

3. An information recording apparatus for recording data recorded in a first recording medium into a second recording medium, comprising:

a reading device for reading the data recorded in the first recording medium;

a decoder for decoding the data recorded in the first recording medium based on a signal from the reading device;

an encoder for encoding the signal decoded by the decoder;

a recording device for recording the data encoded by the encoder into the second recording medium; and a control device for controlling the decoder and encoder so that the decoder continuously decodes the data recorded in the first recording medium including a portion erased by edition and the encoder discontinues the encoding of the signal in accordance with the portion erased by the edition.

4. The information recording apparatus according to claim 1, wherein the data recorded in the first recording medium includes a data string arranged along a time series, and decoding of information included in the data string during decoding by the decoder requires decoding of another information included in the data string.

5. An information recording method for recording data recorded in a first recording medium into a second recording medium, comprising:

a reading process of reading the data recorded in the first recording medium;

a decoding process of decoding the data recorded in the first recording medium based on a signal obtained by the reading process; and a recording process of recording the data recorded in the first recording medium into the second recording medium based on the signal decoded by the decoding process, wherein the decoding process continuously decodes the data recorded in the first recording medium including a portion erased by edition, the recording process discontinues recording in accordance with the portion erased by edition, and data before/after the portion erased by the edition is recorded in the second recording medium so that the data can continuously be reproduced.

6. The information recording method according to claim 5, further comprising:

a converting process of converting the data obtained by the decoding process into an analog signal, wherein the recording process records the analog signal obtained by the converting process into the second recording medium.

7. An information recording method for recording data recorded in a first recording medium into a second recording medium, comprising:

a reading process of reading the data recorded in the first recording medium;

a decoding process of decoding the data recorded in the first recording medium based on a signal obtained by the reading process;

an encoding process of encoding the signal decoded by the decoding process; and a recording process of recording the data encoded by the encoding process into the second recording medium, wherein the decoding process continuously decodes the data recorded in the first recording medium including a portion erased by edition, and the encoding process discontinues encoding of the signal in accordance with the portion erased by the edition.

8. The information recording method according to claim 5, wherein the data recorded in the first recording medium includes a data string arranged along a time series, and the decoding of information included in the data string during the decoding by the decoding process requires decoding of another information included in the data string.

* * * * *